(12) United States Patent
Eck et al.

(10) Patent No.: US 8,055,522 B2
(45) Date of Patent: *Nov. 8, 2011

(54) METHOD, SYSTEM, AND STORAGE MEDIUM FOR FACILITATING EXCESS INVENTORY UTILIZATION IN A MANUFACTURING ENVIRONMENT

(75) Inventors: Brian T. Eck, Poughquag, NY (US); Thomas R. Ervolina, Hopewell Junction, NY (US); Anthony V. Ferreri, Hyde Park, NY (US); George W. Reiche, Pleasant Valley, NY (US)

(73) Assignee: International Business Machines Corporation, Armonk, NY (US)

( * ) Notice: Subject to any disclaimer, the term of this patent is extended or adjusted under 35 U.S.C. 154(b) by 918 days.

This patent is subject to a terminal disclaimer.

(21) Appl. No.: 12/041,711

(22) Filed: Mar. 4, 2008

(65) Prior Publication Data

US 2008/0162230 A1 Jul. 3, 2008

Related U.S. Application Data

(62) Division of application No. 10/210,432, filed on Aug. 1, 2002, now Pat. No. 7,373,371.

(51) Int. Cl.
*G06Q 10/00* (2006.01)

(52) U.S. Cl. .................. 705/7.12; 705/7.25; 705/28

(58) Field of Classification Search ............... 705/7.12, 705/7.25, 28
See application file for complete search history.

(56) References Cited

U.S. PATENT DOCUMENTS

| | | |
|---|---|---|
| 4,646,238 A | 2/1987 | Carlson, Jr. et al. |
| 4,664,294 A | 5/1987 | Hetherington |
| 5,128,861 A | 7/1992 | Kagami et al. |
| 5,237,496 A | 8/1993 | Kagami et al. |
| 5,287,267 A | 2/1994 | Jayaraman et al. |
| 5,630,070 A | 5/1997 | Dietrich et al. |
| 5,699,259 A | 12/1997 | Colman et al. |
| 5,712,989 A | 1/1998 | Johnson et al. |
| 5,765,143 A | 6/1998 | Sheldon et al. |
| 5,884,300 A | 3/1999 | Brockman |
| 5,946,662 A | 8/1999 | Ettl et al. |
| 5,960,414 A | 9/1999 | Rand et al. |

(Continued)

OTHER PUBLICATIONS

Srinivasan, Ramesh; Jayaraman, Rangarajan; Rappold, James A.; Roundy, Robin O.; Tayur, Sridhar. "Procurement of Common Components in a Stochastic Environment". Sep. 1998.*

(Continued)

*Primary Examiner* — Peter Choi
(74) *Attorney, Agent, or Firm* — Cantor Colburn LLP; Derek Jennings

(57) ABSTRACT

A method and storage medium for utilizing excess inventory of parts that are used in end products and having part identifiers are provided. The method includes identifying an excess inventory of parts including part identifiers and a quantity associated with each part identifier. The method also includes identifying potential end products for manufacture comprising a Bill of Materials (BOM) for each end product and where each BOM calls out at least one part identifier in the excess inventory of parts. The method further includes determining a build plan including one or more of the potential end products, the build plan optimized to specific criteria and utilizing an amount of the excess inventory whereby the specific criteria include maximizing the quantity of the excess inventory utilized without exceeding a specific dollar value of additional parts purchased to produce the build plan.

22 Claims, 3 Drawing Sheets

U.S. PATENT DOCUMENTS

| | | | |
|---|---|---|---|
| 5,963,919 | A | 10/1999 | Brinkley et al. |
| 5,970,465 | A * | 10/1999 | Dietrich et al. ............. 705/7.22 |
| 6,006,192 | A | 12/1999 | Cheng et al. |
| 6,014,633 | A | 1/2000 | DeBusk et al. |
| 6,049,742 | A | 4/2000 | Milne et al. |
| 6,119,102 | A | 9/2000 | Rush et al. |
| 6,226,561 | B1 * | 5/2001 | Tamaki et al. ................ 700/100 |
| 6,253,187 | B1 | 6/2001 | Fox |
| 6,260,047 | B1 | 7/2001 | Fox et al. |
| 6,341,271 | B1 | 1/2002 | Salvo et al. |
| 6,529,788 | B1 | 3/2003 | Tani et al. |
| 7,117,164 | B2 * | 10/2006 | Slocum ........................ 705/7.31 |
| 7,231,361 | B2 | 6/2007 | Eck et al. |
| 7,251,611 | B2 | 7/2007 | Abbott et al. |
| 7,289,968 | B2 | 10/2007 | Ferreri et al. |
| 2002/0046125 | A1 | 4/2002 | Speicher et al. |
| 2002/0095348 | A1 | 7/2002 | Hiroshige et al. |
| 2002/0188499 | A1 | 12/2002 | Jenkins et al. |
| 2003/0046191 | A1 | 3/2003 | Ferreri et al. |
| 2003/0101168 | A1 | 5/2003 | Chow et al. |
| 2003/0204455 | A1 | 10/2003 | Eck et al. |
| 2005/0177479 | A1 | 8/2005 | Wei |

OTHER PUBLICATIONS

Tijs, Stef; Koster, Maurice. "General Aggregation of Demand and Cost Sharing Methods". 1998. Annals of Operations Research. vol. 84. pp. 137-164.*

* cited by examiner

METHOD, SYSTEM, AND STORAGE MEDIUM FOR FACILITATING EXCESS INVENTORY UTILIZATION IN A MANUFACTURING ENVIRONMENT

CROSS REFERENCE TO RELATED APPLICATIONS

This application is a divisional of U.S. Ser. No. 10/210,432, filed Aug. 1, 2002, the contents of which is incorporated by reference herein in its entirety.

FIELD OF THE INVENTION

The present invention relates generally to inventory management. More particularly, the present invention relates to a method, system, and storage medium for facilitating excess inventory utilization in a manufacturing environment.

BACKGROUND OF THE INVENTION

In a manufacturing environment products are built that often comprise many possible configurations while sharing some common lower level assemblies and parts in their bills of material. Due to factors such as market fluctuations and other unanticipated environmental changes, it is not uncommon for a manufacturer to be left with excess inventory on certain parts. These parts may include those that are ordered but not yet received in which the manufacturer incurs liability for cancellation, or they may be parts held by a contract manufacturer, or involve other similar types of situations.

Surplus/excess inventory can be problematic for a manufacturer as it can increase costs and reduce profits. Inventory specialists are continually working to reduce inventory levels by finding ways to shorten the pipeline and reduce lead times. Attempts at solving the surplus/excess inventory problem include developing a build plan for end products that would consume as many of these surplus/excess parts as possible. This build decision has been solved in the past in a manual fashion by investigating individual choices one at a time. Not only is this labor intensive, but when an excess parts could be used on several alternative saleable items, each of which might consume various quantities of other excess parts, the problem becomes too complex for the manual approach.

What is needed is a method of assessing existing surplus/excess parts inventories and developing an optimum build plan for end products that would consume these parts.

SUMMARY OF THE INVENTION

An exemplary embodiment of the invention relates to a method and storage medium for utilizing excess inventory of parts that are used in end products and having part identifiers are provided. The method includes identifying an excess inventory of parts including part identifiers and a quantity associated with each part identifier. The method also includes identifying potential end products for manufacture comprising a Bill of Materials (BOM) for each end product and where each BOM calls out at least one part identifier in the excess inventory of parts. The method further includes determining a build plan including one or more of the potential end products, the build plan optimized to specific criteria and utilizing an amount of the excess inventory whereby the specific criteria include maximizing the quantity of the excess inventory utilized without exceeding a specific dollar value of additional parts purchased to produce the build plan.

DETAILED DESCRIPTION OF THE INVENTION

Figure 1:
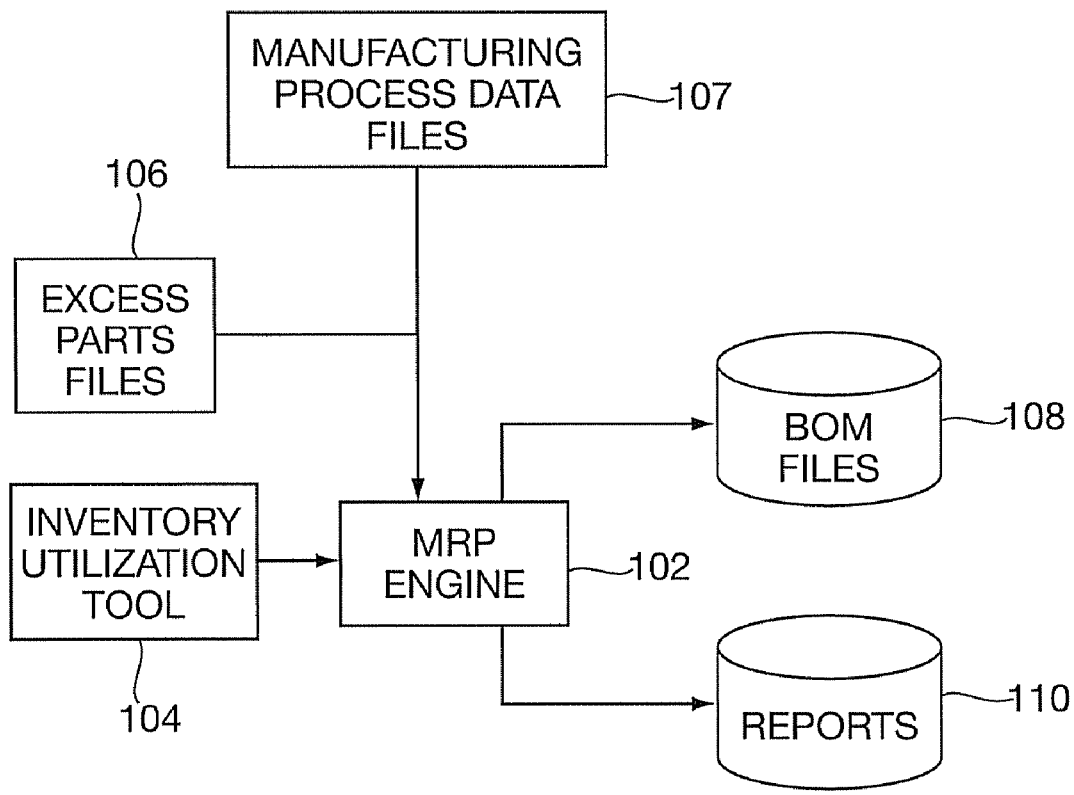
FIG. 1 is a block diagram of an exemplary system for facilitating excess inventory utilization management.

FIG. 1 is a block diagram of an exemplary system for facilitating excess inventory utilization in accordance with an exemplary embodiment of the invention. Excess parts files (also referred to herein as excess inventory files) 106 are provided by manufacturing/inventory personnel and contain lists of any excess/surplus (herein referred to as 'excess') parts along with the quantity in excess. Manufacturing process data files 107 may include data relating to yields, cycle times, usage rates, capacities, alternative parts, and other desirable information. Data from these files 106 and 107 are submitted to a Manufacturing Resource Planning (MRP) engine 102 that employs the inventory utilization tool 104 of the invention. BOM files in database 108 store parts lists for saleable end items. Saleable end items refers to parts, products, subassemblies, and includes any item that can be produced and sold for revenue by a manufacturing entity in order to use up excess inventory. The inventory utilization tool 104 comprises a shell script for generating new BOM data structures as will be discussed further herein. A reports database 110 is included in FIG. 1 and stores reports generated by the inventory utilization tool 104 for analysis and review by specified inventory specialists (also referred to herein as inventory planners).

Figure 2:
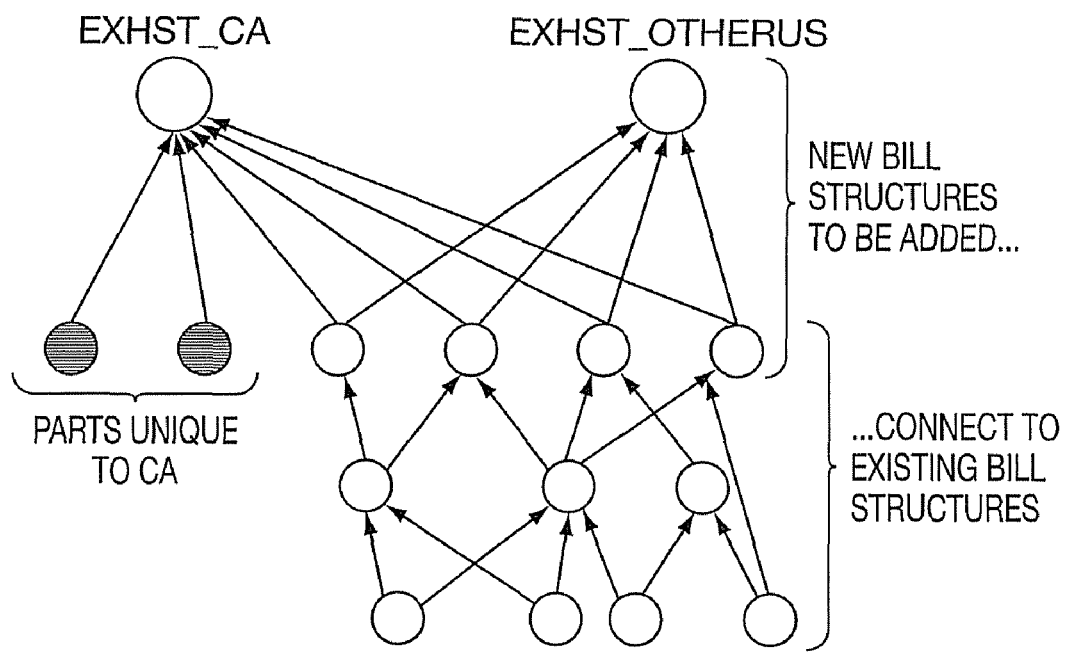
FIG. 2 is a graphical depiction of a sample bill of material structure used in a translation process of the inventory utilization tool.
Figure 3:
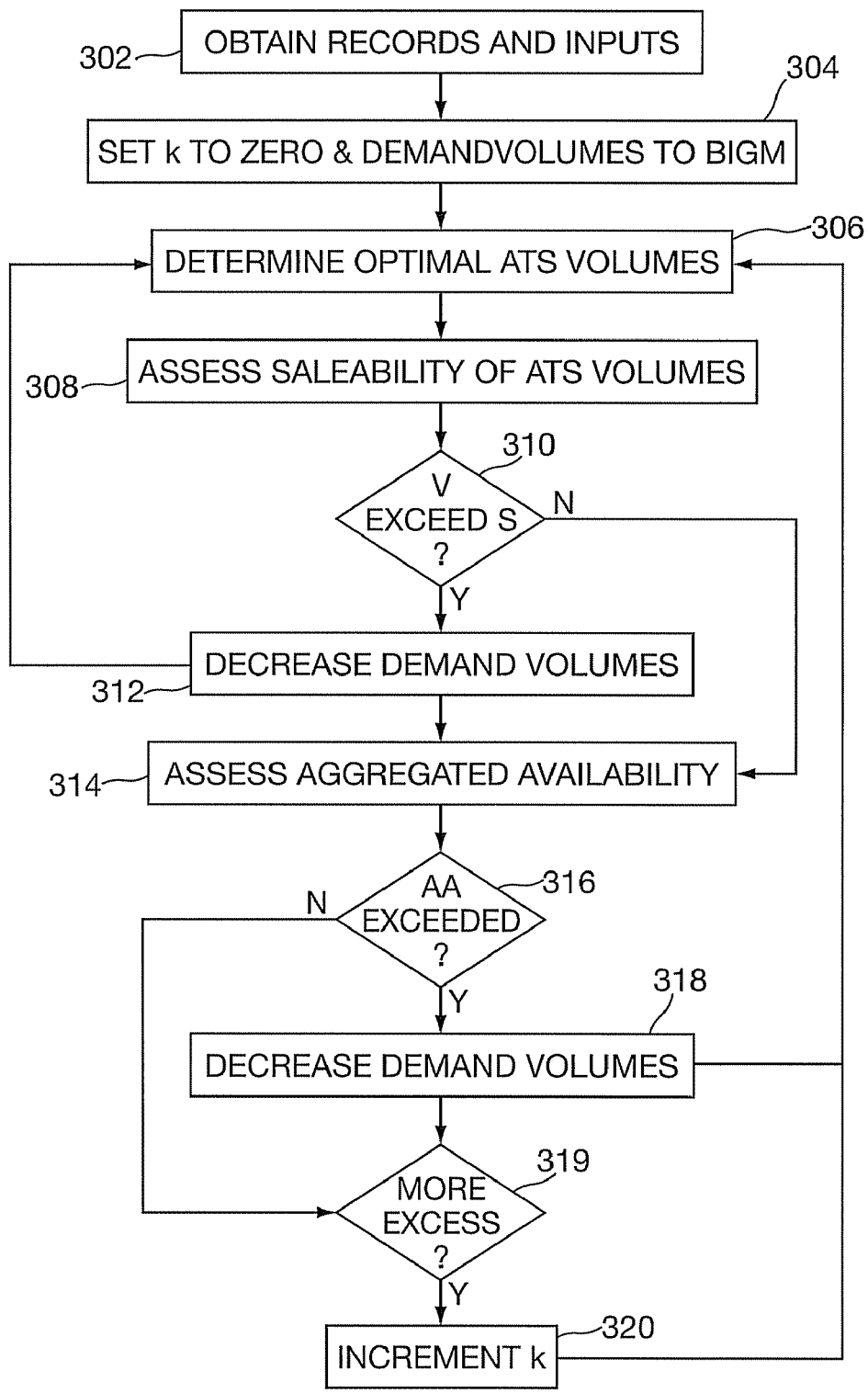
FIG. 3 is a flowchart of a process for assisting an inventory planner in determining an optimum build plan in an exemplary embodiment.

Operation of the inventory utilization tool from the perspective of an inventory planner of a manufacturing entity will now be described with reference to FIGS. 2 and 3. In an exemplary embodiment, the inventory utilization tool employs a method comprising a translation segment and a solution segment.

For products (also referred to herein as saleable end items) that are fairly complex, and the configuration choices numerous, a simplified way of describing them may be helpful so that customers and salespeople of the manufacturing entity have an easier time deciding on and ordering what they want. This 'sales nomenclature' involves a mapping process at time of order placement whereby products are transcribed from sales-specific terminology to bill of material part numbers (referred to herein as 'manufacturing nomenclature'). The mapping is preferably many-to-many, and may often be order dependent (i.e., one-way mapping).

For example, in placing an order for an upgraded automobile interior, the dealer may specify a code 'DLUX'. This code is the same for model X (economy car), model Y (luxury sedan), or model Z (sports utility vehicle). However, the part numbers required for that order (i.e., part numbers that are needed in order for manufacturing to fulfill the order) are dependent on the code 'DLUX' as well as the model number of the vehicle (i.e., model X, Y, or Z).

There are two decisions this method supports: (1) which saleable end items to produce out of the excess inventory in order to use up as much inventory as possible while incurring minimal costs for purchasing additional lower-level parts needed to 'square up sets' and produce the end items; and (2) how to express the choice of saleable end items in sales nomenclature, even though the available inventory is expressed in manufacturing nomenclature.

The translation segment takes information presented in manufacturing terms and translates it into sales terms. Product descriptions of saleable end items using sales nomenclature are referred to herein as 'features'. Saleable end items include items which can be sold for revenue. A personal computer is one example of a saleable end item. Some features may require the same part numbers, regardless of other aspects of the order (e.g., a replacement headlight might be referred to as "HDLT" and would include a distinct set of parts to build). These features are referred to herein as 'simple features'.

Features that require just one other piece of information in order to know the exact part numbers required are referred to as 'plus-one simple' features. Plus-one simple features become 'simple' with the addition of one piece of data. For example, an automobile exhaust system requires knowing the state in which the vehicle will be registered due to differing emission controls among the states. The exhaust system may be referenced as 'EXHST' with a plus-one feature for the state.

The bill of materials structure for plus-one simple features can be built by making a copy of the feature for each distinct value of the additional information (i.e., distinct in the sense that different parts are required). For example, if California required different parts in its exhaust systems but all other states had the same parts, two saleable assembly parts would be created out of the one feature as illustrated in FIG. 2.

This concept may be extended to 'plus-two simple' features, 'plus-three simple' features, and so on. The saleable assembly parts created out of a 'plus-k simple' feature would be k-tuples, resulting in potentially extensive proliferation of similar bill records as 'k' gets large.

This same approach may extend to features whose translation depends on the presence of other features. For example, a deluxe interior (described as one feature) coupled with a stereo (described as a second feature) may require a different dashboard cover (identified by a different part number) than a deluxe interior without that stereo.

In practice, it makes sense to capture those features which are as simple as possible, yet make up the vast majority of all features. Plus-one or plus-two simple features may be all that are necessary to describe these features. Any other or more complex features could be omitted from the build-out decision, unless they can be expressed in a different way.

Once the new BOM structure is established, the tool assists the MRP engine in the solution segment as described herein.

The decision of what to build out of excess parts requires a way to distinguish value between choices of saleable end items, often expressed as either revenue or profit. This decision is very similar to the decision of what can best be built out of a set of constrained parts. This latter problem has been modeled in various ways and solved by linear programming (LP) tools as well as various heuristics (e.g., local search techniques), artificial intelligence techniques (e.g., genetic algorithms, neural networks, tabu search, etc.), and non-linear optimization (e.g., gradient search techniques). One such approach involves an optimization engine which uses a set of subroutines called the Watson Implosion Tool (WIT). This approach is the subject of U.S. Pat. No. 5,630,070, entitled "Optimization of Manufacturing Resource Planning". The model of the present invention differs in that an a priori expression of demand that a manufacturer is trying to satisfy is not needed. Also, a manufacturer may wish to express an upper limit (referred to as 'k') on how much to spend for additional materials in order to use up one dollar of excess inventory. Further, revenues per unit of a saleable item (i.e., prices) may be volume-dependent, a factor addressed by the present invention. Finally, higher-level (e.g., assembly) items in excess may also be disassembled to create and then reuse supply of these low-level parts in other products.

The method involves getting all data related to the manufacturing process (e.g., yields, cycle times, usage rates, capacities, alternate parts, etc.) from manufacturing process database 107 or other similar data source and formulate constraints related to the usage of materials in producing other materials, and eventually, saleable end items. If no revenue data are available, the choice amongst saleable end items can be made by using a formula, 'k' times 'ei' (expressed as k*ei), as the revenue for item 'i' where 'ei' is the amount in dollars of excess inventory consumed when producing/selling one unit of item 'i'. The scalar factor 'k' referenced above may be set by a decision maker. Ei is calculated by using a 'pegging' subroutine applied to a variant of the original problem, where a dummy part is added as a component of all other parts, with usage rate set to the value of the part for those that are excess inventory, and to zero otherwise. This step assists in balancing two competing forces: how important is using up excess (at any cost) versus how important is it to not incur additional cost (for squaring up sets). This balance is reflected through 'k', which indicates how much one is willing to spend (in additional purchases) at a maximum in order to use of one dollar of excess. For example, a manufacturing entity may be interested in spending $1.00 for every dollar of excess inventory to be disposed. Alternatively, a manufacturing entity may be more interested in getting rid of inventory and may choose to spend $3.00 to dispose of a $1.00 of excess inventory. The 'k' factor expresses this sensitivity between using up excess and minimizing additional spending.

In order to find the most desirable solution for a given value of 'k', the problem may be modeled as a linear equation as follows.

$$\text{Maximize profit=Revenue minus Cost}$$

It will be noted that the cost to build a saleable end item is the cost of all components where those in excess are considered free, and the revenue is 'k' times the excess consumed in building one end item. This equation assumes that the price the marketplace would pay for the item is not known. If actual prices are known, they can be substituted for revenue in the above equation. Thus, using the scaling factor, one can optimize how much excess to be consumed (e.g., setting 'k' very large), or how little additional purchase required (e.g., setting 'k' very small), or somewhere in between. Alternatively, if market prices are available, they may be utilized in the equation in order to optimize overall profit.

The optimization objective may be more general than profitability, for example, by factoring in a priority on the saleable end items that reflects how perishable they are, how easy they are to sell, how seasonable they may be, etc. By way of example and not limitation, other optimization objectives may include or take into account strategic objectives (e.g., a loss leader), special customer service needs, or any other desired business purpose. This information can be most generally considered "business impact" information, which can be balanced with other factors such as the relative desirability of building end items, with the relative cost of additional purchases needed, and the benefit of consuming the excess inventory. It is generally known in the art that there are situations influencing production decisions beyond mechanical analysis of simple profitability defined by revenue minus costs of an individual end item.

Note that this business impact can also vary over time and by volume. For example, the company might be able to sell 100 units at $5,000 each but selling more than 100 units would only be possible if the price were dropped to $4,800. In this example, business impact would be defined as profit (e.g., end product revenue minus the cost of parts in the associated BOM, cost of manufacturing, etc.), and the revenues for saleable end items would be defined by piece-wise linear functions of the volume sold. Since some of the parts in excess inventory (as well as the end products and end items to be made from such parts) may lose value more quickly than others (i.e., more "perishable"), there may be a higher priority associated with particular parts in excess inventory or end products which will in turn affect the optimization of the build plan.

Similarly, the costs of additional purchase items may depend on time or volume. Additionally, by treating an excess inventory item or part as "saleable" (that is, it could be sold by itself, or built into a higher-level product), one can also capture the dynamic of time-dependent scrap value (perishability). Finally, some of the items required for building a saleable end item may be constrained (e.g., have an 'infinite' cost to acquire beyond a certain number of units). All of these considerations on 'business impact' can be taken into account in finding an optimal solution.

The optimization criteria used in the optimization are non-demand criteria. Non-demand criteria are those criteria that can be assessed without having a demand statement associated with one or more end products. Demand statements are a quantity that is forecasted or confirmed of how many end products can be sold. In many instances, demand statements are broken out over units of time (e.g., 10 of product 'X' in January, 50 of product 'Y' in 2002). In configurable products, such as high end computer systems, it is difficult to develop demand statements on every permutation. Examples of non-demand criteria are: utilizing the quantity or dollar value of inventory, minimizing additional dollars spent to utilize quantity or dollar value of inventory, maximizing profit of end items, taking into account other business criteria such as perishability, a loss leader, etc., or anything else that does not include a demand statement.

In MRP systems and other support tools for helping companies decide what to build, demand for end products is a critical, if not the most critical criteria for optimizing a build plan. The intent is to produce where there is a known demand as represented by demand statements for the end products that the business entity produces.

When focusing on surplus/excess parts inventory, the optimization of the build plan will focus on criteria relevant to the surplus/excess inventory such as the quantity or dollar value of inventory consumed by the build plan or the overall potential business impact of the end products produced. These decisions are initially made absent demand statements and the build plan is assessed for ease of sale or as a guide to areas where steps should be taken to increase demand. In other words, the present invention assists in generating opportunities while existing MRP systems and support tools typically match supply to a proposed demand for end products. One way of using the exemplary embodiment would be to generate a number of possible build scenarios optimized using non-demand criteria and having marketing professionals do demand analysis or other analysis to determine which of the opportunities identified would be easiest to execute.

The process of utilizing the above optimization component in a manufacturing setting will now be described.

Basic records and inputs are obtained at step 302. These include BOM, costs, revenue (if available), inventory, and ei data. The tool sets k to zero and 'DemandVolumes' to 'Big M' at step 304. 'Big M' refers to an initial upper limit in linear programming and is used as an initial solution (e.g., a demand to satisfy) in starting the optimization process. This value, or upper limit, is selected for the purpose of initiating implementation of the linear program only and does not reflect actual or specific demand values (e.g., a random or arbitrary value). An implosion tool is used to find optimal available-to-sell (ATS) volumes for end-items at step 306. The saleability of ATS volumes are assessed at step 308. If ATS volumes exceed saleability at step 310, then 'DemandVolumes' for those items are decreased at step 312 and the process returns to step 306. Steps 306-308 are repeated until ATS volumes are less than or equal to saleability. Aggregated availability is assessed at step 314. If aggregated availability is exceeded for any item groups at step 316, then demand volumes for items within this group are decreased at step 318 and the process again returns to step 306; otherwise, the process continues at step 319 in which the consumption of excess items is assessed. If more excess needs to be consumed, then k is incremented at step 320 and the process returns to step 306. Steps 306-319 may be repeated until there is no more excess requiring consumption.

The present invention enables a manufacturer to pursue a concerted effort in sales and to sell through items which will consume excess inventory. These efforts may include alternate channels (such as e-auctions or discount brokers), marketing campaigns, use as repair parts, etc. Furthermore, the approach to translating from manufacturing into sales nomenclature has further applications to expressing available-to-promise (ATP) in terms meaningful to the sales force and customers.

As described above, the present invention can be embodied in the form of computer-implemented processes and apparatuses for practicing those processes. The present invention can also be embodied in the form of computer program code containing instructions embodied in tangible media, such as floppy diskettes, CD-ROMs, hard drives, or any other computer-readable medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

It will be evident to those skilled in the art that the present invention provides many improvements over the current state of the art of ratio planning. Data from a variety of systems and locations is being collected into a single database in order to provide a single, integrated repository for ratio planning data. The invention allows ratio planners to catalogue part numbers and models in order to provide some structure and meaning to the thousands of seemingly random part numbers. The cataloging provides an easy way to pull information together for reports. Additionally, the invention provides the ability, through the use of pre-defined reports, to generate reports very quickly and with a minimum of computer database expertise on the part of the ratio planner. The invention is well suited for both small manufacturers with relatively few ratios as well as very large manufacturers with tens of thousands of ratios.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation to the teachings of the invention without departing from the essential scope thereof. Therefore, it is intended that the invention not be limited to the particular embodiments for carrying out this invention, but that the invention will include all embodiments falling within the scope of the appended claims.

What is claimed is:

1. A method for utilizing excess inventory of parts, the parts used in end products and having part identifiers, the method comprising:
    identifying, via a computer processor, an excess inventory of parts comprising part identifiers and a quantity associated with each part identifier;
    identifying potential end products for manufacture comprising a Bill of Materials (BOM) for each end product and where each BOM calls out at least one part identifier in the excess inventory of parts; and
    determining, via a computer processor, a build plan comprising one or more of the potential end products, the build plan optimized to specific criteria and utilizing an amount of the excess inventory wherein the specific criteria comprise maximizing the quantity of the excess inventory utilized without exceeding a specific dollar value of additional parts purchased to produce the build plan;
    wherein a cost value is associated with each part identifier and wherein the specific criteria further comprise a scalar value representing a ratio of the dollar amount spent to purchase the additional parts in order to consume one dollar's worth of the excess inventory.

2. The method of claim 1 further comprising a cost value associated with each part identifier and wherein the specific criteria further comprise maximizing the total cost value of the excess inventory utilized.

3. The method of claim 1 further comprising a cost value associated with each part identifier and wherein the specific criteria further comprise maximizing the total cost value of the excess inventory utilized without exceeding the specific dollar value of the additional parts purchased to produce the build plan.

4. The method of claim 1 wherein the specific criteria further comprise minimizing the amount of additional money spent in order to utilize the excess inventory.

5. The method of claim 1 further comprising profitability information on each potential end product and wherein the specific criteria further comprise maximizing the overall profit of the build plan.

6. The method of claim 1 further comprising business impact information and wherein the specific criteria further comprise taking into account the business impact of the build plan.

7. The method of claim 1 wherein the build plan is determined using an optimizing solver.

8. The method of claim 7 wherein the optimizing solver is selected from the group consisting of:
    linear programming tools;
    heuristic engines;
    artificial intelligence techniques; and
    non-linear optimization engines.

9. A method for utilizing excess inventory of parts absent demand statement information, the parts used in end products and having part identifiers, the method comprising:
    Identifying, via a computer processor, an excess inventory of parts comprising part identifiers and a quantity associated with each part identifier;
    identifying potential end products for manufacture comprising a Bill of Materials (BOM) for each end product and where each BOM calls out at least one part identifier in the excess inventory of parts; and
    determining, via a computer processor, a build plan comprising one or more of the potential end products, the build plan optimized to non- demand criteria and utilizing an amount of the excess inventory wherein the non-demand criteria is assessed without having the demand statement information associated with the one or more of the potential end products;
    wherein a cost value is associated with each part identifier and wherein the non-demand criteria comprise a scalar value representing a ratio of the dollar amount spent to purchase additional parts in order to consume one dollar's worth of the excess inventory.

10. The method of claim 9 wherein the non-demand criteria comprise a criterion selected from the group consisting of:
    maximizing the quantity of the excess inventory utilized;
    maximizing the quantity of the excess inventory utilized without exceeding a specific dollar value of additional parts purchased to produce the build plan; and
    minimizing the amount of additional money spent in order to utilize the amount of the excess inventory.

11. The method of claim 9 further comprising a cost value associated with each part identifier and wherein the non-demand criteria comprise a criterion selected from the group consisting of:
    maximizing the total cost value of the excess inventory utilized; and
    maximizing the total cost value of the excess inventory utilized without exceeding a specific dollar value of additional parts purchased to produce the build plan.

12. The method of claim 9 further comprising profitability information on each potential end product and wherein the non-demand criteria comprise maximizing the overall profit of the build plan.

13. The method of claim 9 further comprising business impact information and wherein the non-demand criteria comprise taking into account the business impact of the build plan.

14. The method of claim 9 wherein the build plan is determined using an optimizing solver.

15. The method of claim 14 wherein the optimizing solver is selected from the group consisting of:
    linear programming tools;
    heuristic engines;
    artificial intelligence techniques; and
    non-linear optimization engines.

16. A storage medium embodied with machine readable computer program code for utilizing excess inventory of parts absent demand statement information, the parts used in end products and having part identifiers, the computer program code causing a computer to implement a method comprising:
    identifying an excess inventory of parts comprising part identifiers and a quantity associated with each part identifier;
    identifying potential end products for manufacture comprising a Bill of Materials (BOM) for each end product and where each BOM calls out at least one part identifier in the excess inventory of parts;

determining a build plan comprising one or more of the potential end products, the build plan optimized to non-demand criteria and utilizing an amount of the excess inventory wherein the non-demand criteria is assessed without having the demand statement information associated with the one or more of the potential end products; and implementing a cost value associated with each part identifier, wherein the non-demand criteria comprise a scalar value representing a ratio of the dollar amount spent to purchase additional parts in order to consume one dollar's worth of the excess inventory.

17. The storage medium of claim 16 wherein the non-demand criteria comprise a criterion selected from the group consisting of:

maximizing the quantity of the excess inventory utilized;

maximizing the quantity of the excess inventory utilized without exceeding a specific dollar value of additional parts purchased to produce the build plan; and minimizing the amount of additional money spent in order to utilize the amount of the excess inventory.

18. The storage medium of claim 16 further comprising instructions for causing the computer to implement a cost value associated with each part identifier and wherein the non-demand criteria comprise a criterion selected from the group consisting of:

maximizing the total cost value of the excess inventory utilized; and maximizing the total cost value of the excess inventory utilized without exceeding a specific dollar value of additional parts purchased to produce the build plan.

19. The storage medium of claim 16 further comprising instructions for causing the computer to implement profitability information on each potential end product and wherein the non-demand criteria comprise maximizing the overall profit of the build plan.

20. The storage medium of claim 16 further comprising instructions for causing the computer to implement business impact information and wherein the non-demand criteria comprise taking into account the business impact of the build plan.

21. The storage medium of claim 16 wherein the build plan is determined using an optimizing solver.

22. The storage medium of claim 21 wherein the optimizing solver is selected from the group consisting of:

linear programming tools;

heuristic engines;

artificial intelligence techniques; and non-linear optimization engines.

* * * * *